United States Patent [19]
Boiko et al.

[11] 3,915,807
[45] Oct. 28, 1975

[54] APPARATUS FOR CULTIVATING MICROORGANISMS

[76] Inventors: Valery Ivanovich Boiko, ulitsa Sovetskaya, 13a, kv. 14, Angarsk Irkutskoi oblasti; Nikolai Semenovich Mester, ulitsa Chernyshevskogo, 29, kv. 27, Moscow; Inhokenty Alexandrovich Meinikov, ulitsa Kurchatova, 5, kv. 41, Irkutsk; Petr Ivanovich Nikolaev, ulitsa Pulkovskogo, 27, kv. 105, Moscow; Evgeny Leonidovich Mikhailov, ulitsa Kurchatova, 5, kv. 22; Jury Iosifovich Jurievich, ulitsa Kurchatova, 5a, kv. 38, both of Irkutsk; Alexandr Zakharovich Yakovenko, ulitsa Zheltovskogo, 10/7, kv. 24, Moscow, all of U.S.S.R.

[22] Filed: Apr. 29, 1974

[21] Appl. No.: 471,710

Related U.S. Application Data
[63] Continuation of Ser. No. 292,835, Sept. 27, 1972, abandoned.

[52] U.S. Cl. .................. 195/142; 195/139; 195/143
[51] Int. Cl.² ............................................ C12B 1/14
[58] Field of Search ........... 195/139, 142, 143, 127, 195/107, 109

[56] References Cited
UNITED STATES PATENTS
3,405,920 10/1968 Lefrancois ..................... 195/142 X Primary Examiner—A. Louis Monacell
Assistant Examiner—R. B. Penland
Attorney, Agent, or Firm—Holman & Stern

[57] ABSTRACT

Apparatus wherein there is achieved vertical circulation of culture liquid, thus preventing demulsification thereof, due to a passage provided for the culture liquid from the central zone to the circular space between the walls of said vessel and a cylinder concentrically disposed within said vessel. Uniform distribution of nutrient components throughout the cross-section of said vessel is ensured by means of a tube for mixing said nutrient components disposed along the vertical axis of said cylinder.

5 Claims, 2 Drawing Figures

APPARATUS FOR CULTIVATING MICROORGANISMS

This is a continuation of application Ser. No. 292,835, filed Sept. 27, 1972, now abandoned.

BACKGROUND AND SUMMARY OF THE INVENTION

The present invention relates to the equipment used in a fermentation process for performing microbiological synthesis, and more particularly to apparatuses for cultivating microorganisms in liquid media.

The present invention can be advantageously applied for cultivating microorganisms in various hydrocarbon media: liquid parafins, diesel oil, gaseous hydrocarbons, etc., and in media containing alimentary and non-alimentary raw materials, such as molasses, wood hydrolysis products, etc.

Furthermore, the present apparatuses can be used for cultivating microorganisms in hydrolysis products obtained from agricultural wastes, as well as in sulphite liquors that are papermaking wastes.

Known in the art is an apparatus for cultivating microorganisms, comprising a vessel with cover, means for agitating and aerating the culture medium, equidistantly arranged along a circle within the vessel, and pipes for supplying an aerating agent and nutrient components to the vessel.

A disadvantage of such prior art apparatus is found in the fact that attempts to increase its dimensions to ensure high unit efficiency have resulted in demulsification of the medium, insufficiently uniform distribution of nutrients, media entrainment by the exhausted aerating agent, uneven turbulence and aeration throughout the bulk of the medium, all of which impair the mass transfer and eventually lead to decreased efficiency of the apparatus.

It is an object of this invention to overcome the above disadvantages.

The present invention is based on the problem of creating such an apparatus as will eliminate the possibility of demulsification of the culture media, simultaneously ensuring uniform distribution of nutrient substances, minimum entrainment of the media by the spent aerating agent and maximum achievable uniform turbulency and aeration of the culture media, and eventually having a higher efficiency as compared with the known apparatuses. The apparatus for cultivating microorganisms according to the present invention includes a vessel with a cover, means for agitating and aerating the culture liquid, equidistantly arranged along a circle within said vessel, and pipes for supplying an aerating agent and nutrient components into said vessel, wherein according to the invention a cylinder is provided, being concentrically arranged therein and secured at a certain distance from the bottom of said vessel, thus providing a passage for the culture liquid from the central zone into the annular space formed by the cylinder and the walls of said vessel, in which vessel means are arranged for agitating and aerating said culture liquid, thereby ensuring vertical circulation of said culture liquid in said vessel, thus preventing its demulsification, while a tube for mixing the nutrient components is coaxially disposed inside the cylinder. The top end of said tube is made in the form of a funnel and connected with said pipes for supplying the nutrient components, while the bottom end is in the form of a funnel having a flange parallel to the bottom of said vessel and at a certain distance therefrom, forming a circular gap for uniform distribution of the nutrient components across the cross-section of the vessel.

The proposed apparatus is preferably provided with a means for entrapping droplets of the nutrient liquid from the exhausted aerating agent, said means communicating with the top portion of the vessel and disposed directly above the funneled portion of the tube, through which funnel droplets of the nutrient liquid return to the tube, thus minimizing the entrainment of the nutrient liquid by the exhausted aerating agent.

It is also perferable to provide cups with mechanical foam breakers in the cover of the vessel, said cups communicating with the means for entrapping droplets of liquid from the exhausted aerating agent, which arrangement is also conducive to preventing loss of the media from the vessel due to its entrainment by the exhausted aerating agent.

Especially important is the construction of the means for agitating and aerating the media, calling for stirrers to be disposed in a multi-row arrangement on the shafts, said stirrers ensuring uniform turbulization and aeration of the culture media throughout the whole volume of the annular space where they are located.

To ensure uniform distribution of the aerating agent throughout the whole volume of the annular space, the vessel is provided with manifolds for distributing the aerating agent, having branch pipes communicating with each aerating and agitating means.

BRIEF DESCRIPTION OF THE DRAWINGS

The invention will now be explained in greater detail with reference to an embodiment thereof which is represented in the accompanying drawings wherein.

DESCRIPTION OF THE PREFERRED EMBODIMENTS

Figure 1:
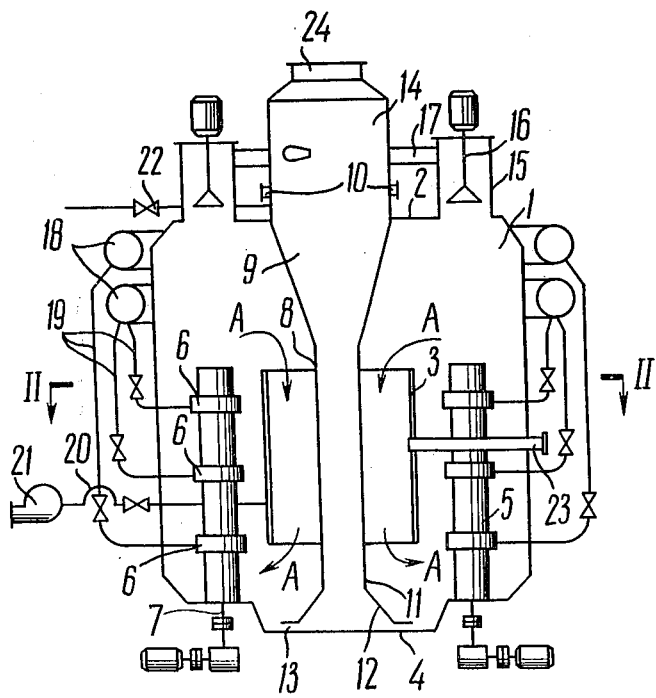
FIG. 1 is a schematic diagram of apparatus for cultivating microorganisms, in longitudinal section.
Figure 2:
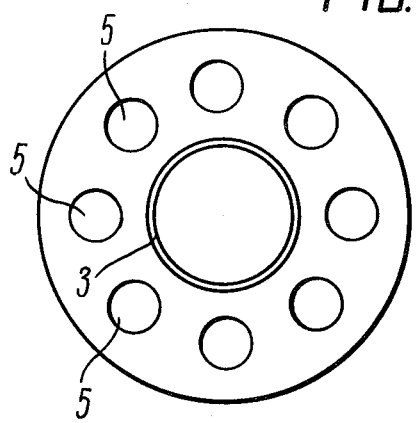
FIG. 2 is a section along line II—II in FIG. 1.

The apparatus for cultivating microorganisms is essentially a vessel (FIG. 1) with cover 2 and a cylinder 3 concentrically disposed within said vessel, being secured at a certain distance from the bottom 4 of vessel 1 to provide a passage for the culture liquid from the central zone into the annular space wherein circumferentially disposed are means 5 (FIG. 2) for agitating and aerating, which arrangement ensures vertical circulation to prevent demulsification of said media.

The means 5 for agitating and aerating the media features a multi-row arrangement of stirrers 6, mounted on externally driven shafts 7 to ensure a more uniform turbulization and aeration of the media throughout the annular space.

In the center of the apparatus, along the vertical axis of the cylinder 3, there is secured a tube 8 (FIG. 1), serving as a mixer for nutrient components, the upper end 9 of said tube being funnel-shaped and connected with pipes 10 for supplying the nutrient components, while its bottom end 11 is also funneled, the edge of the funnel forming a flange parallel to the bottom 4 of vessel 1, thus providing a circular gap 13 to ensure uniform distribution of the nutrient components across the cross-section of vessel 1.

A means 14 is provided in the apparatus for entrapping droplets of liquid from the exhausted aerating agent, said means communicating with the upper portion of vessel 1 and located directly over the funnel 9, through which funnel the droplets of liquid trickle down the tube 8. The cover 2 of vessel 1 is provided with cups 15 with mechanical foam breakers 16. The upper portion of said vessel communicates via the cups 15 of mechanical foam breakers 16 and through pipes 17 with the means 14 for entrapping the droplets of liquid from the exhausted aerating agent.

On the outside, the vessel 1 is provided with manifolds 18 for distributing the aerating agent, said manifolds having branch pipes 19 connected to stirrers 6 of each means for agitating and aerating.

The heat generated by the microorganisms in the process of their vital activity is dissipated by heat exchangers located outside the apparatus (not shown in the drawings) and connected, by means of piping 20 and pump 21, with the central zone of the apparatus. Also, the piping 22 serving for returning the culture liquid from the heat exchangers is connectec with the funnel 9 of pipe 8 of the mixer.

To recover from the apparatus the prepared culture liquid having minimum content of the nutrient components for further processing, the apparatus is equipped with a pipe 23 communicating with the central zone located inside the cylinder 3.

The apparatus operates as follows:

The apparatus is filled with a liquid which contains all the required nutrient components, then a pure strain of microorganisms prepared in a separate smaller apparatus is planted therein. The aerating agent is supplied through the manifolds 18 and branch pipes 19 to the means 5 for agitating and aerating, located inside the apparatus. Thereupon the means 5 for agitating and aerating the media are actuated, thereby effecting intensive turbulization and aeration of the culture media uniformly throughout the annular space, resulting in intensive mass transfer between the culture liquid and the aerating agent.

Due to its being highly saturated with gas, the turbulent gas-liquid mass in the annular space tends to rise. Having reached the surface and becoming partially free from the aerating agent, the thicker culture liquid, together with part of the foam, enters the cylinder 3, sinks down to the bottom (along the path shown by arrow A), with great speed and reenters the annular space zone towards the means 5 for agitation and aeration, forming a circulation loop (view along arrows A—A), thus preventing demulsification of the culture liquid and ensuring better distribution of the biomass throughout the entire height of the apparatus.

The nutrient components supplied through the pipes 10 into the funnel 9 of the mixer tube 8 flow downwards, mixing together in the process of movement, and thereafter, flow through the circular gap 13 between the flanged edge 12 of tube 8 and the bottom 4 of vessel 1 so that they are uniformly distributed across the whole cross-section, being entrained by the circulating flow of the culture liquid.

The exhausted aerating agent is separated from the foam in the mechanical foam breakers 16, and thereupon enters the means 14 for entrapping the droplets of liquid, arranged directly above the funnel 9, through which funnel the droplets of liquid trickle down the tube 8. The spent aerating agent, with its moisture having been removed, is exhausted through the outlet connection 24, located at the top of the means 14. To remove heat generated by the microorganisms in the process of their vital activity, a certain volume of the culture liquid is withdrawn from the central zone of the apparatus where the content of the aerating agent, which tends to impair heat transfer, is minimal, and is pumped through pipings 20 and 22 by pump 21, to be circulated through the externally disposed heat exchangers and returned into funnel 9 of tube 8.

Through pipe 23, communicating with the central zone, located inside the cylinder 3, the prepared culture liquid is recovered for further processing.

The experimental models of the apparatus according to the present invention were tested under laboratory and pilot-plant conditions, on simulated and actual media, and the tests conducted proved their working ability and high efficiency.

What is claimed is:

1. An apparatus for cultivating microorganisms, comprising a vessel with a cover, pipes for supplying an aerating agent and nutrient components into said vessel, a cylinder concentrically disposed inside said vessel and secured therein at a certain distance from the bottom and the walls of said vessel to form an annular space between the outer surface of said cylinder and the inner surface of said vessel, thus providing a passage for the culture liquid from the central zone into said annular space; means for agitating and aerating said culture liquid equidistantly disposed in the annular space within said vessel, thus ensuring vertically directed circulation of the culture liquid to prevent demulsification thereof; a tube for mixing nutrient components therein, coaxially disposed inside said cylinder, having two ends, the top end of said tube being made in the form of a funnel and connected with said pipes for supplying the nutrient components, while the bottom end of said tube is in the form of a funnel which has a flange parallel to the bottom of said vessel at a certain distance therefrom, forming a circular gap between said flange and said bottom of said vessel for uniform distribution of the nutrient components across the cross section of the vessel.

2. An apparatus as claimed in claim 1, wherein means is provided for entrapping droplets of liquid from the exhausted aerating agent, said means communicating with the top portion of the vessel and being disposed directly above the funneled portion of the tube, through which funnel droplets of culture liquid trickle back into the tube.

3. An apparatus as claimed in claim 2, having cups with mechanical foam breakers provided in the cover of said vessel, said cups communicating at their hollow bottoms with the top space of said vessel and in their top portion, via pipings, with the means for entrapping droplets of liquid from the exhausted aerating agent.

4. An apparatus as claimed in claim 1, wherein the means for agitating and aerating the media includes stirrers disposed in a multi-row arrangement on shafts to ensure uniform turbulization and aeration of the culture medium.

5. An apparatus as claimed in claim 1, wherein the vessel is equipped on the outside with a manifold for distributing the aerating agent, with branch pipes to each means for agitating and aerating the culture liquid.

* * * * *